US008917903B2

(12) United States Patent
Yamakawa

(10) Patent No.: US 8,917,903 B2
(45) Date of Patent: Dec. 23, 2014

(54) IMAGE INSPECTION APPARATUS, IMAGE FORMING APPARATUS, IMAGE INSPECTION METHOD, AND IMAGE INSPECTION PROGRAM

(71) Applicant: Shinji Yamakawa, Kanagawa (JP)

(72) Inventor: Shinji Yamakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 88 days.

(21) Appl. No.: 13/645,811

(22) Filed: Oct. 5, 2012

(65) Prior Publication Data

US 2013/0136314 A1 May 30, 2013

(30) Foreign Application Priority Data

Oct. 13, 2011 (JP) ................................ 2011-225987
Aug. 29, 2012 (JP) ................................ 2012-188851

(51) Int. Cl.
*G06K 9/00* (2006.01)

(52) U.S. Cl.
USPC ............................ 382/100; 382/135; 382/137

(58) Field of Classification Search
None
See application file for complete search history.

(56) References Cited

U.S. PATENT DOCUMENTS 4,264,808 A * 4/1981 Owens et al. ................... 705/30
5,327,508 A * 7/1994 Deaton et al. ................. 382/100
5,444,518 A * 8/1995 Hashiguchi et al. .......... 399/271
5,862,434 A * 1/1999 Yamakawa ...................... 399/54
8,510,221 B2 * 8/2013 Votaw et al. ..................... 705/43
2009/0208088 A1 * 8/2009 Saltsov et al. ................. 382/135
2010/0188714 A1 * 7/2010 Yamakawa .................... 358/504
2011/0052078 A1 * 3/2011 Yamakawa .................... 382/199
2013/0200606 A1 * 8/2013 Omar .............................. 283/74
2014/0037182 A1 * 2/2014 Williams et al. .............. 382/137

FOREIGN PATENT DOCUMENTS

JP 2005-024960 1/2005
JP 2005-205853 8/2005
JP 2005-217932 8/2005
JP 2008-292269 12/2008
JP 2009-000930 1/2009
JP 2009-078457 4/2009

* cited by examiner

*Primary Examiner* — Avinash J Yentrapati
(74) *Attorney, Agent, or Firm* — Harness, Dickey & Pierce, P.L.C.

(57) ABSTRACT

An image inspection apparatus for inspecting a recording medium having first and second sides is devised. The image inspection apparatus includes a penetrated-image information obtaining unit to obtain information of penetrated-image; an inspection information storage to store information of upper permissible limit of image penetration; a pre-print image penetration inspection unit to obtain an image penetration level from the first side to the second side, to compare the obtained image penetration level and the upper permissible limit, and to inspect an image penetration from the first side to the second side; a pre-print image penetration prediction unit to predict, before an image is formed on the second side, an image penetration level from the second side to the first side; and a post-print image inspection unit to inspect images on the first and second sides after forming the image on the second side.

6 Claims, 5 Drawing Sheets

FIG. 4

INSPECTION CRITERIA TABLE Tb1

| | | 1ST FACE | |
|---|---|---|---|
| | | WITHOUT IMAGE | WITH IMAGE |
| 2ND FACE | WITHOUT IMAGE | 3 | 2 |
| | WITH IMAGE | 2 | 1 |

FIG. 5

IMAGE PENETRATION DETERMINATION TABLE Tb2

| DOT AREA RATIO [%] | U1 (SHEET A) | U2 (SHEET B) | U3 (SHEET C) |
|---|---|---|---|
| 0 | 0 | 0 | 0 |
| 20 | 1.0 | 0.2 | 0.1 |
| 50 | 5.0 | 2.5 | 1.3 |
| 90 | 9.0 | 4.5 | 2.5 |

IMAGE INSPECTION APPARATUS, IMAGE FORMING APPARATUS, IMAGE INSPECTION METHOD, AND IMAGE INSPECTION PROGRAM

CROSS-REFERENCE TO RELATED APPLICATIONS

This application claims priority to Japanese Patent Application Nos. 2011-225987, filed on Oct. 13, 2011 and 2012-188851, filed on Aug. 29, 2012 in the Japan Patent Office, which are incorporated by reference herein in their entirety.

BACKGROUND

1. Technical Field

The present invention relates to an image inspection apparatus, an image forming apparatus, an image inspection method, and an image inspection program, and more particularly to an image inspection apparatus, an image forming apparatus, an image inspection method, and an image inspection program to inspect the quality of images formed on recording media.

2. Description of the Background Art

Conventionally, to enhance image quality inspection precision, a sheet on which an image is formed is scanned both before and after image formation to obtain an inspection-target image regardless of whether the image forming operation involves single-sided printing or duplex printing. Then, the inspection-target image is compared with source image data to determine the quality of the printed image. The results of the sheet surface scan taken before conducting image formation are used to determine the quality of the recording media sheet.

When an image is formed on a first side of a sheet, such image may be observable on a second side of the sheet opposite the first side. In this specification, for simplicity, this phenomenon is referred to as image penetration, and image inspection conducted to detect for inspecting such phenomenon is referred to as image penetration inspection.

Ideally, such inspection should be conducted after each image forming operation. For example, with duplex printing, image penetration inspection should be conducted after the first image is formed. However, in actuality such image penetration inspection cannot be conducted when a first image is formed on the first side of the sheet, but can be conducted only after a second image is formed on the second side of the sheet, which means after the images are formed on both of the first and second sides. As a result, an image failure occurring at formation of a first image on the first side cannot be detected until after the second image is formed on the second side of the sheet. Therefore, image forming resources such as toner, ink, paper, or the like are consumed needlessly, and the image forming apparatus is degraded by unnecessary printing.

SUMMARY

In one aspect of the present invention, an image inspection apparatus for inspecting images formed on a recording medium having a first side and a second side opposite the first side is devised. The image inspection apparatus includes a penetrated-image information obtaining unit to obtain penetrated-image information corresponding to an image penetration from the first side to the second side when an image is formed on the first side; an inspection information storage to store information used for an image penetration inspection, the information including an upper permissible limit of image penetration from the first side to the second side caused by the image formed on the first side; a pre-print image penetration inspection unit, using a processing device, configured to: obtain an image penetration level from the first side to the second side based on the penetrated-image information obtained by the penetrated-image information obtaining unit; compare the obtained image penetration level and the upper permissible limit of image penetration stored in the inspection information storage; and inspect an image penetration from the first side to the second side when the image is formed on the first side of the recording medium; a pre-print image penetration prediction unit to predict, before an image is formed on the second side, an image penetration level from the second side to the first side caused by the image to be formed on the second side, based on the penetrated-image information obtained by the penetrated-image information obtaining unit and data of the image to be formed on the second side; and a post-print image inspection unit, using the processing device, to inspect quality of the image already formed on the first side and the image formed on the second side after forming the image on the second side, based on the prediction result computed by the pre-print image penetration prediction unit.

In another aspect of the present invention, a method of inspecting images formed on a recording medium having a first side and a second side opposite the first side using an image inspection apparatus having an inspection information storage to store information used for an image penetration inspection is devised. The information includes an upper permissible limit of image penetration caused by an image formed on the first side to the second side. The method includes the steps of 1) obtaining penetrated-image information corresponding to an image penetration from the first side to the second side when an image is formed on the first side; 2) obtaining the image penetration level from the first side to the second side based on the penetrated-image information obtained by step 1); 3) comparing the obtained image penetration level and the upper permissible limit of image penetration stored in the inspection information storage; 4) inspecting an image penetration from the first side to the second side when the image is formed on the first side of the recording medium; 5) predicting an image penetration level from the second side to the first side caused by an image to be formed on the second side, before forming the image on the second side, based on the penetrated-image information obtained by step 1) and data of the image to be formed on the second side; and 6) inspecting quality of the image already formed on the first side and the image formed on the second side after forming the image on the second side based on the prediction result computed at the predicting step.

In another aspect of the present invention, a non-transitory computer-readable storage medium storing a program that, when executed by a computer, causes the computer to execute a method of inspecting images formed on a recording medium having a first side and a second side opposite the first side using an image inspection apparatus having an inspection information storage to store information used for an image penetration inspection is devised. The information includes an upper permissible limit of image penetration caused by an image formed on the first side to the second side. The method includes the steps of 1) obtaining penetrated-image information corresponding to an image penetration from the first side to the second side when an image is formed on the first side; 2) obtaining the image penetration level from the first side to the second side based on the penetrated-image information obtained by step 1); 3) comparing the obtained image penetration level and the upper permissible limit of image penetration stored in the inspection information storage; 4) inspecting an image penetration from the first side to the second side when the image is formed on the first side of the recording medium; 5) predicting an image penetration level from the second side to the first side caused by an image to be formed on the second side, before forming the image on the second side, based on the penetrated-image information obtained by step 1) and data of the image to be formed on the second side; and 6) inspecting quality of the image already formed on the first side and the image formed on the second side after forming the image on the second side based on the prediction result computed at the predicting step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 shows an example of inspection criteria table Tb1;

FIG. 5 shows an example of an image penetration determination table Tb2;

Figure 1:
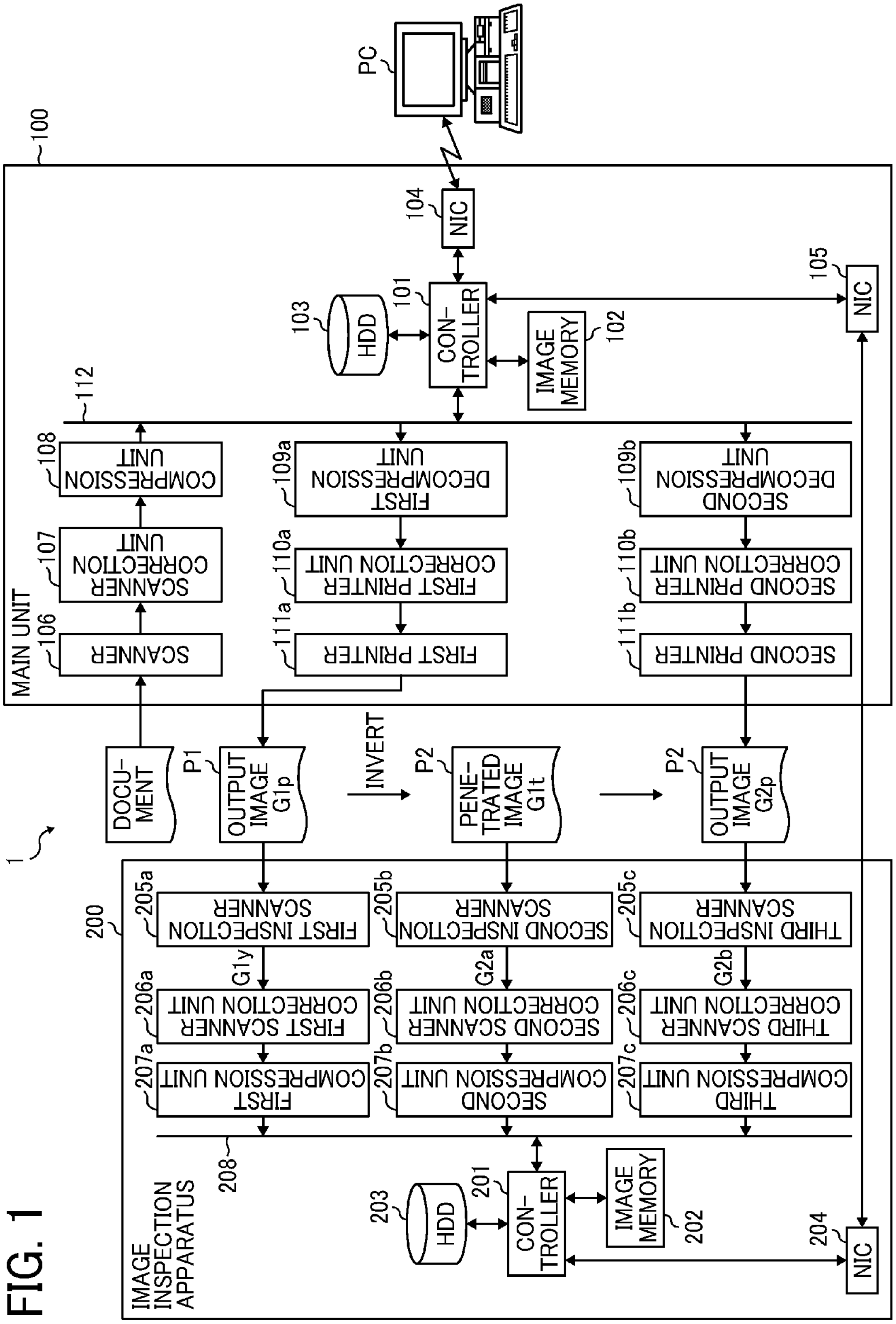
FIG. 1 shows a block diagram of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

FIGS. 1 to 8 show an embodiment of an image inspection apparatus, an image forming apparatus, an image inspection method, and an image inspection program. FIG. 1 shows a block diagram of an image forming apparatus 1 including an image inspection apparatus, an image forming apparatus, an image inspection method, and an image inspection program according to an example embodiment.

FIG. 1 shows a block diagram of the image forming apparatus 1 according to an example embodiment. As shown in FIG. 1, the image forming apparatus 1 may include a main unit 100, and an image inspection apparatus 200 or image inspector 200. The image inspection apparatus 200 inspects image quality of an image formed on a sheet P by the main unit 100. Specifically, the image inspection apparatus 200 inspects whether an image formed on one side of a sheet is observable on the opposite side of the sheet when a concerned image is formed on the sheet P by the main unit 100, wherein such phenomenon that one image formed on one side is observed on the opposite side is referred to as image penetration, and an inspection to determine the image penetration level from one side to the opposite side is referred to as image penetration inspection.

The main unit 100 may include a controller 101, an image memory 102, a hard disk drive (HDD) 103, network interface cards (NIC) 104 and 105, a scanner 106, a scanner correction unit 107, a compression unit 108, a first decompression unit 109*a*, a first printer correction unit 110*a*, a first printer 111*a* (or first plotter 111*a*), a second decompression unit 109*b*, a second printer correction unit 110*b*, and a second printer 111*b* (or second plotter 111*b*). In the main unit 100, the controller 101, the compression unit 108, the first decompression unit 109*a*, and the second decompression unit 109*b* can be connected with each other by a universal bus 112. Such main unit 100 can be used as an image forming unit.

The image inspection apparatus 200 may include a controller 201, an image memory 202, a hard disk drive (HDD) 203, a network interface card (NIC) 104, a first inspection scanner 205*a*, a first scanner correction unit 206*a*, a first compression unit 207*a*, a second inspection scanner 205*b*, a second scanner correction unit 206*b*, a second compression unit 207*b*, a third inspection scanner 205*c*, a third scanner correction unit 206*c*, and a third compression unit 207*c*. In the image inspection apparatus 200, the controller 201, the first compression unit 207*a*, the second compression unit 207*b*, and the third compression unit 207*c* can be connected with each other by a universal bus 208.

Figure 2:
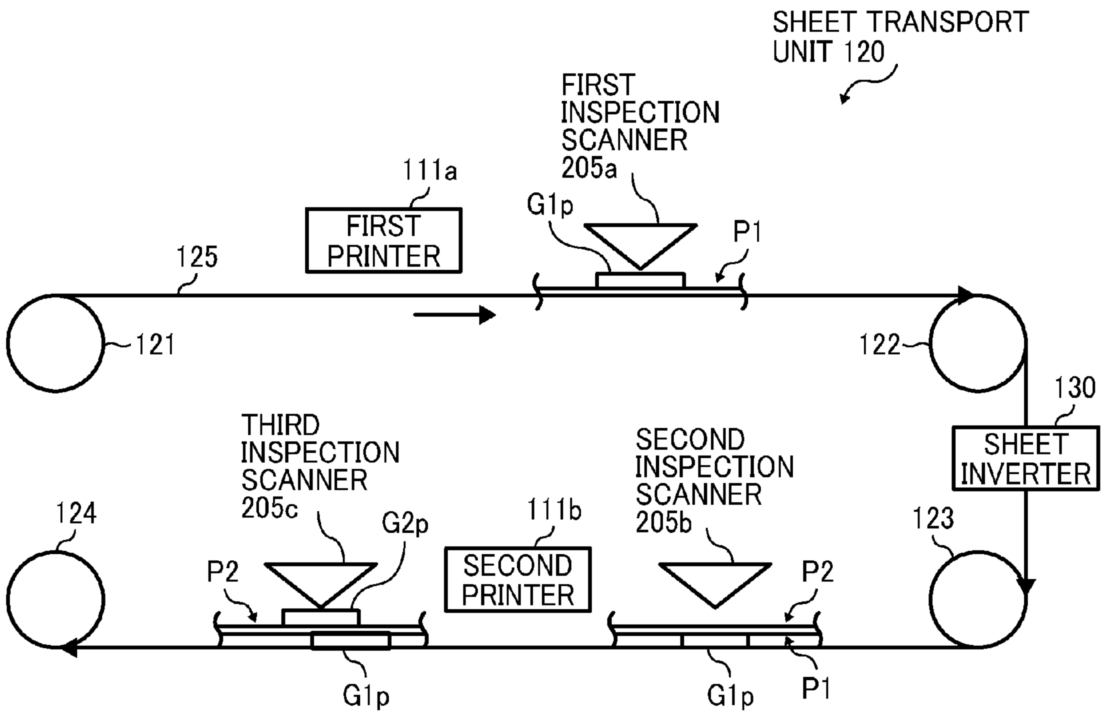
FIG. 2 shows a main section of the image forming apparatus of FIG. 1.

FIG. 2 shows a main section of the image forming apparatus of FIG. 1. As shown in FIG. 2, the image forming apparatus 1 may include a sheet transport unit 120 in the main unit 100, and further the first inspection scanner 205*a*, the second inspection scanner 205*b*, and the third inspection scanner 205*c* of the image inspection apparatus 200 may be disposed in the sheet transport unit 120.

In the sheet transport unit 120, a transport belt 125 such as an endless belt is extended by four rollers 121 to 124. A sheet feed unit feeds the sheet P used as a recording medium onto the transport belt 125 from a side of the roller 121. The sheet feed unit may include a sheet feed cassette to store sheets (e.g., sheet P) having a given size, a feed unit to feed the sheet P, stored in the sheet feed cassette (see FIG. 1), one by one from the top sheet to the sheet transport unit 120.

Further, a sheet inverter 130 is disposed between the first inspection scanner 205*a* and the second inspection scanner 205*b*. The sheet inverter 130 can invert sides of the sheet P from one side to the opposite side such as from a front side to a rear side of the sheet P. The sheet inverter 130 known as a sheet inverting system can be used.

In the sheet transport unit 120, one of the rollers 121 to 124 is driven by a drive motor. The transport belt 125, rotatable in a clockwise direction shown by an arrow in FIG. 2, can transport the sheet P by adsorbing the sheet P on transport belt 125.

In the sheet transport unit 120, the first printer 111*a* (i.e., image forming system) and the first inspection scanner 205*a* are disposed between the roller 121 and the roller 122 while the first printer 111*a* and the first inspection scanner 205*a* are adjacently disposed along the transport belt 125.

The second inspection scanner 205*b* used as a scanner to scan the second side P2, the second printer 111*b* (i.e., image forming system), and the third inspection scanner 205*c* are disposed between the roller 123 and the roller 124 while the second inspection scanner 205*b*, the second printer 111*b*, and the third inspection scanner 205*c* adjacently disposed along the transport belt 125.

A description is given of the main unit 100. The controller 101 may include a central processing unit (CPU), a read only memory (ROM), and a random access memory (RAM). The ROM stores programs and system data. The programs may be basic programs of the image forming apparatus 1, image forming control programs to control an image forming control process to be conducted based on an inspection result of the image inspection apparatus 200. Further, such programs can be stored in the HDD 103.

In the controller 101, the CPU controls units of the image forming apparatus 1 such as each unit in the main unit 100 by loading programs in the ROM and using a RAM as a working memory to execute basic processing of the image forming apparatus 1, and to execute the image forming control process based on the inspection result of the image inspection apparatus 200.

The NIC 104 is connected to external devices such as a personal computer PC. The NIC 104 is used to communicate data and commands such as print data described by page description language (PDL) with the personal computer PC.

The scanner 106 is an image scanner using, for example, a charge coupled device (CCD), a complementary metal oxide semiconductor (CMOS), or the like. The scanner 106 scans document image in the main scanning direction and the sub-scanning direction with a given resolution (e.g., 600 dpi), binarizes the scanned image into YMCK digital image data, and outputs the binarized image data to the scanner correction unit 107.

The scanner correction unit 107 conducts an image processing to YMCK image data of digital data, scanned by the scanner 106, and outputs the processed data to the compression unit 108, in which, the scanner correction unit 107 conducts recognition of characters, line image, and photograph in an image area, and a removal of background information (e.g., image information) from document image.

Upon receiving the image data such as YMCK data having 8-bit for each color corrected by the scanner correction unit 107, the compression unit 108 compresses the image data, and transmits the compressed image data to the controller 101 via the universal bus 112. Further, if the bandwidth of the universal bus 112 is broad enough, and the HDD 103 to store the image data has a great capacity, the image data may not be required to be compressed by the compression unit 108, in which the un-compressed image data can be used.

The controller 101 receives the image data, for example, page-by-page, and stores such image data to a semiconductor memory such as a RAM. The controller 101 computes coordinate of image data, which is required for the image inspection. The controller 101 transmits the computed coordinate data, bibliographic information, and the image data to the controller 201 of the image inspection apparatus 200 via the NIC 105 of the image forming apparatus 1, and the NIC 104 of the image inspection apparatus 200, and may also store the image data to the HDD 103.

Further, upon receiving the image data and print condition setting command from the personal computer PC, the print condition setting command is analyzed in the image forming apparatus 1. Then, the image data is converted to bitmap data as a printable page-by-page data using the image memory 102, and then compressed and stored in the HDD 103. While such storing process is conducted in the image forming apparatus 1, coordinate of the image data required for the image inspection at the image inspection apparatus 200 is computed, and then the computed coordinate data, bibliographic information, and the image data is transmitted to the controller 201 of the image inspection apparatus 200 via the NIC 105 of the image forming apparatus 1, and the NIC 104 of the image inspection apparatus 200.

The image data stored in the HDD 103 can be transmitted from the image forming apparatus 1 to the personal computer PC as follows. Specifically, the image data stored in the HDD 103 can be loaded to the image memory 102, and then image processing for the image data can be conducted in the image forming apparatus 1. The image processing may be a color conversion process, a grayscale conversion process matched to a transmission mode, and a format conversion such as conversion to universal image format, which may be joint picture engineering group (JPEG), tagged image file format (TIFF) or the like. After conducting the image processing, the image data is transmitted to the personal computer PC, disposed on the network, via the NIC 104 of the image forming apparatus 1.

Under the control of the controller 101, the HDD 103 stores various data such as image data, and programs required for processing.

When the controller 101 conducts various image processing to the image data, the image memory 102 can be used to store the image data temporarily.

When the first printer 111*a* is used for an image forming operation, the controller 101 reads the image data for a first side P1 (or front side) from the HDD 103, and the controller 101 outputs the image data to the first decompression unit 109*a* via the universal bus 112. The first decompression unit 109*a* decompresses the compressed image data to the un-compressed image data such as YMCK image data having 8-bit for each color, and outputs the un-compressed image data to the first printer correction unit 110*a*.

Upon receiving the un-compressed image data from the first decompression unit 109*a*, the first printer correction unit 110*a* conducts correction processes such as a gamma correction process, a half-toning process or the like, in which the first printer correction unit 110*a* conducts a brightness correction process and a grayscale conversion process matched to the first printer 111*a*, and outputs the processed image data to the first printer 111*a*. In the grayscale conversion process, the first printer correction unit 110*a* uses the error diffusion method and/or dithering method to convert the image data from 8 bit to 2 bit for each color.

The first printer 111*a* may use the electrophotography system or the inkjet system to form images on the sheet P. Specifically, upon receiving image data (i.e., source image data for the first side P1) from the personal computer PC, or image data (i.e., source image data for the first side P1) scanned by the scanner 106 via the first printer correction unit 110*a*, the first printer 111*a* forms or prints an output image G1*p* on the first side P1 of the sheet P based on the image data.

As such, when the first printer 111*a* uses the electrophotography system for forming images on the sheet P using image drawing data, parts required for electrophotography system may include, for example, a photoconductor, an optical writing unit, a development unit, a transfer unit, a fusing unit, a charging unit, and a cleaner. The optical writing unit is activated by the image data and control signals to form an electrostatic latent image on the photoconductor, and then the development unit supplies toner onto the photoconductor to develop the latent image as a toner image.

As for the first printer 111*a*, a sheet feed unit feeds the sheet P to a nip between the photoconductor and a transfer unit, at which the toner image is transferred from the photoconductor to the first side P1 of the sheet P, and then the sheet P transferred with the toner image is transported to the fusing unit. The fusing unit applies heat and pressure to fuse the toner image on the first side P1 of the sheet P, by which the output image G1*p* can be formed.

When an image forming operation is conducted by the second printer 111*b*, the controller 101 reads the image data used for forming an image on a second side P2 (or rear side) of the sheet P from the HDD 103, and then the controller 101 outputs the image data to the second decompression unit 109*b* via the universal bus 112. As similar to the first decompression unit 109*a*, the second decompression unit 109*b* decompresses the compressed image data to the un-compressed image data such as YMCK image data having 8-bit for each color, and outputs the un-compressed image data to the second printer correction unit 110*b*.

As similar to the first printer correction unit 110*a*, upon receiving the un-compressed image data from the second decompression unit 109*b*, the second printer correction unit 110*b* conducts correction processes such as a gamma correction process, a half-toning process or the like, in which the second printer correction unit 110*b* conducts a brightness correction process and a grayscale conversion process matched to the second printer 111*b*, and outputs the processed image data to the second printer 111*b*.

As similar to the first printer 111*a*, the second printer 111*b* may use the electrophotography system or the inkjet system to form images on the sheet P. Specifically, upon receiving image data (i.e., source image data for the second side P2) from the personal computer PC, or image data (i.e., source image data for the second side P2) scanned by the scanner 106 via the second printer correction unit 110*b*, the second printer 111*b* forms or prints an output image G2*p* on the second side P2 of the sheet P based on the image data. In this disclosure, the first printer 111*a* and the second printer 111*b* may use electrophotography for image forming operations.

Figure 3:
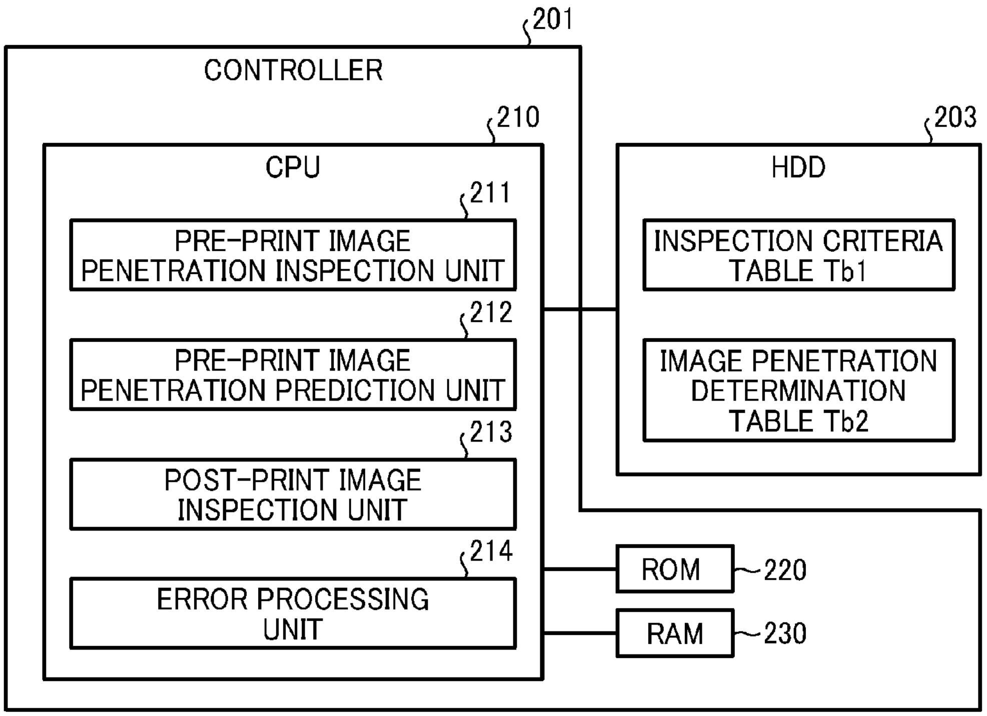
FIG. 3 shows a block diagram of functional units of an image inspection apparatus shown in FIG. 1.

FIG. 3 shows a block diagram of functional units of the image inspection apparatus shown in FIG. 1. As shown in FIG. 3, the controller 201 include a central processing unit (CPU) 210, a read only memory (ROM) 220, and a random access memory (RAM) 230, connectable with each other. The CPU 210 may include a pre-print image penetration inspection unit 211, a pre-print image penetration prediction unit 212, a post-print image inspection unit 213, and an error processing unit 214. Further, the ROM 220 stores control programs, and the RAM 230 can be used as a working memory. Further, the CPU 210 can be connected to a hard disk drive (HDD) 203, which stores an inspection criteria table Tb1 and an image penetration determination table Tb2, to be described later.

The pre-print image penetration inspection unit 211 obtains the image penetration level based on penetrated-image information obtained by the second inspection scanner 205*b* used as a penetrated-image information obtaining unit. The penetrated-image information may include the level of image penetration from the first side P1 to the second side P2 when an image is formed on the first side P1. Such image penetration level can be compared with the upper permissible limit of image penetration level stored in the HDD 203 (i.e., inspection information storage) to inspect an image penetration effect from the first side P1 to the second side P2 of the sheet P (i.e., recording medium) when the image is printed on the first side P1.

The pre-print image penetration prediction unit 212 predicts an image penetration level from the second side P2 to the first side P1 before printing or forming an image on the second side P2 based on the penetrated-image information of the first side P1 obtained by the second inspection scanner 205*b*, and image data to be printed on the second side P2, the opposite side of the first side P1.

The post-print image inspection unit 213 inspects an image penetration level for images on the first side P1 and the second side P2 after printing the image on the second side P2 based on a prediction result of the pre-print image penetration prediction unit 212, by which quality of images on the first side P1 and the second side P2 can be determined.

The error processing unit 214 conducts an abnormal image processing. For example, the error processing unit 214 conducts an error processing such as ejecting the sheet P by using the error processing unit 114 without conducting the subsequent image forming process and image inspection process.

A description is given of the image inspection apparatus 200. The controller 201 of the image inspection apparatus 200 includes, for example, the central processing unit (CPU) 210, the read only memory (ROM) 220, and the random access memory (RAM) 230. The ROM 220 stores programs and system data. The programs and system data may be basic programs used for the image inspection, and image inspection program to control the image inspection method, and such programs can be stored in the HDD 203. In the controller 201, the CPU 210 controls each unit in the image inspection apparatus 200 by loading programs in the ROM 220 and using the RAM 230 as a working memory to execute basic processing of the image inspection apparatus 200, and the image inspection process according to an example embodiment.

As for the image forming apparatus 1, computer software of the image inspection method can be provided to the programmable device using any storage medium for storing processor readable code such as a flexible disk, a read only memory (ROM), a compact disk read only memory (CD-ROM), a compact disc rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a flash memory, a memory card or stick such as a USB memory, a memory chip, a mini disk (MD), secure digital (SD) card, a magneto optical disc (MO), magnetic tape, a hard disk in a server, a solid state memory device or the like, but not limited these. The image inspection program for executing the image inspection method according to an example embodiment can be read from such storage medium, and loaded to the RAM 230 of the controller 201 and the HDD 203.

With such a configuration, as for the image forming apparatus 1, degradation of image forming functionality of the second printer 111*b* can be suppressed or prevented, and wasteful consumption of image forming materials such as toner can be reduced while the image inspection apparatus 200 conducts the image inspection effectively based on the image inspection method.

In the above-described example embodiment, a computer can be used with a computer-readable program for the image inspection program, described by object-oriented programming languages such as C++, Java (registered trademark), JavaScript (registered trademark), Perl, Ruby, or legacy programming languages such as machine language, assembler language to control functional units used for the apparatus or system, and the computer-readable program can be stored in the above described storage medium, and distributed using the above described storage medium.

The NIC 204 of the image inspection apparatus 200 is connected to the NIC 105 of the main unit 100, by which data and commands can be communicated with the main unit 100.

The HDD 203 stores various data such as image data and programs under the control of the controller 201.

The image memory 202 stores image data temporarily when the controller 201 conducts various types of processing for image data.

The first inspection scanner 205*a* may be, for example, an image scanner having a charge coupled device (CCD) or a complementary metal oxide semiconductor (CMOS). The first inspection scanner 205*a* optically scans the sheet P output from the first printer 111*a* in the main scanning direction and the sub-scanning direction. Specifically, the first inspection scanner 205*a* scans the first side P1 of the sheet P printed or formed with the output image G1*p* by the first printer 111*a*, and/or the first side P1 of the sheet P not formed with the output image G1*p* by the first printer 111*a*. The first inspection scanner 205*a* scans the image on the first side P1 of the sheet with a given resolution level, and binarizes the image data. The binarized image data is referred to as data G1*y*, and the data G1*y* is output to the first scanner correction unit 206*a*. The data G1*y* is the data of image formed on the first side P1 of the sheet P and scanned and binarized by the first inspection scanner 205*a*.

The first inspection scanner 205*a* scans the image formed on the first side P1 of the sheet P as digital data, which may be RGB image data. Then, the first scanner correction unit 206*a* conducts image processing such as a filtering process to such RGB image data, and outputs the processed image data to the first compression unit 207*a*.

Upon receiving the image data such as RGB image data having 8-bit for each color corrected by the first scanner correction unit 206*a*, the first compression unit 207*a* compresses the image data, and transmits the compressed image data to the controller 201 via the universal bus 208. Further, if the bandwidth of the universal bus 208 is broad enough, and the HDD 203 to store the image data has a great capacity, the image data may not be required to be compressed by the first compression unit 207*a*, in which the un-compressed image data can be used.

The second inspection scanner 205*b* has a configuration similar to the first inspection scanner 205*a*. After the first side P1 (front side) and the second side P2 (rear side) of the sheet P are inverted by the sheet inverter 130, the second inspection scanner 205*b* scans the second side P2 of the sheet P output from the first printer 111*a*. Specifically, the first printer 111*a* forms the output image G1*p* on the first side P1, and then the sheet inverter 130 inverts the first side P1 (front side) and the second side P2 (rear side) of the sheet P, at which the sheet P is at a timing before the second printer 111*b* forms on the second side P2. Further, the first printer 111*a* may output the sheet P without forming an image on the first side P1, and then the sheet inverter 130 inverts the first side P1 (front side) and the second side P2 (rear side) of the sheet P, at which the sheet P is at a timing before the second printer 111*b* forms on the second side P2.

The second inspection scanner 205*b* scans the second side P2 before forming an image on the second side P2, in which the second inspection scanner 205*b* may scan a penetrated image G1*t*, penetrated from the output image G1*p* to the second side P2, and stains such as foreign particles on the second side P2. Then, the scanned image data is binarized, and output to the second scanner correction unit 206*b* as scanned data G2*a*, which may be, for example, RGB data. As such, the scanned data G2*a* is the data obtained by scanning the second side P2 before forming an image on the second side P2.

The second inspection scanner 205*b* scans the image appeared on the second side P2 of the sheet P as digital data, which may be RGB image data referred to as the scanned data G2*a*, wherein the scanned data G2*a* is data obtained before forming an image on the second side P2 of the sheet P. The second scanner correction unit 206*b* conducts the image processing such as filtering process to the scanned data G2*a* (e.g., RGB image data), and outputs the processed scanned data G2*a* to the second compression unit 207*b*.

Upon receiving the image data such as RGB data having 8-bit for each color corrected by the second scanner correction unit 206*b*, the second compression unit 207*b* compresses the image data, and transmits the compressed image data to the controller 201 via the universal bus 208. Further, if the bandwidth of the universal bus 208 is broad enough, and the HDD 203 to store the image data has a great capacity, the image data may not be required to be compressed by the second compression unit 207*b*, in which the un-compressed image data can be used.

The third inspection scanner 205*c* has a configuration similar to the first inspection scanner 205*a*. The third inspection scanner 205*c* scans the second side P2 of the sheet P output from the second printer 111*b*. Specifically, the first printer 111*a* forms the output image G1*p* on the first side P1, then the sheet inverter 130 inverts the first side P1 (front side) and the second side P2 (rear side) of the sheet P, and then the second printer 111*b* forms the output image G2*p* on the second side P2, or the second printer 111*b* outputs the sheet P without forming an image on the second side P2.

After the sheet P is output from the second printer 111*b*, the third inspection scanner 205*c* scans the second side P2 to read an image, which may be present on the second side P2, wherein such image may be the penetrated image G1*t* caused by the output image G1*p*, the output image G2*p* formed by using the second printer 111*b*, and/or stains such as foreign particles. The scanned image data is binarized, and output to the third scanner correction unit 206*c* as scanned data G2*b*. The scanned data G2*b* is the data obtained by scanning the second side P2 after forming an image on the second side P2.

The third inspection scanner 205*c* scans the image appeared on the second side P2 of the sheet P as digital data, which may be RGB image data referred to as the scanned data G2*b*, wherein the scanned data G2*b* is data obtained after forming the image on the second side P2 of the sheet P. The third scanner correction unit 206*c* conducts the image processing such as filtering process to the scanned data G2*b* (e.g., RGB image data), and outputs the processed scanned data G2*b* to the third compression unit 207*c*.

Upon receiving the image data such as RGB data having 8-bit for each color corrected by the third scanner correction unit 206*c*, the third compression unit 207*c* compresses the image data, and transmits the compressed image data to the controller 201 via the universal bus 208. Further, if the bandwidth of the universal bus 208 is broad enough, and the HDD 203 to store the image data has a great capacity, the image data may not be required to be compressed by the third compression unit 207*c*, in which the un-compressed image data can be used.

Then, the controller 201 conducts image inspection for the sheet P scanned by any one of the first inspection scanner 205*a*, the second inspection scanner 205*b*, and the third inspection scanner 205*c*, in which the first side P1 and/or the second side P2 of the sheet P may be scanned, as required.

The controller 201 may conduct an image inspection for the first side P1 of the sheet P, scanned by the first inspection scanner 205*a*, in which the output image G1*p* formed on the first side P1 by the first printer 111*a* is scanned. It should be noted that the first printer 111*a* may not always form the output image G1*p* on the first side P1 if no image data is prepared for printing, in which the first side P1 not formed of the image is scanned by the first inspection scanner 205*a*.

Further, before forming the output image G2*p* on the second side P2 of the sheet P by the second printer 111*b*, the second inspection scanner 205*b* scans the second side P2 to obtain the scanned data G2*a*. By using the scanned data G2*a*, the controller 201 may also conduct an image inspection for the second side P2.

Further, after forming the output image G2*p* on the second side P2 of the sheet P by the second printer 111*b*, the third inspection scanner 205*c* scans the second side P2 to obtain the scanned data G2*b*. By using the scanned data G2*b*, the controller 201 may also conduct an image inspection for the second side P2. It should be noted that the second printer 111*b* may not always form the output image G2*p* on the second side P2 of the sheet P if no image data is prepared for printing, in which the second side P2 of the sheet P not formed of the image is scanned by the third inspection scanner 205*c*.

Therefore, as for the image forming apparatus 1, the ROM 220 and/or the HDD 203 of the controller 201 may store an inspection criteria table Tb1 shown in FIG. 4, and an image penetration determination table Tb2 shown in FIG. 5.

The first side P1 and the second side P2 of the sheet P can be scanned by selecting a scanner from the first inspection scanner 205*a*, the second inspection scanner 205*b*, and the third inspection scanner 205*c*.

The inspection criteria table Tb1 includes image inspection criteria set for the following four cases (A) to (D), each of which is a combination of image presence/absence on the first side P1 and the second side P2 of the sheet P.

Case (A): first side P1 has an image, and second side P2 has an image; Case (B), first side P1 has an image, and second side P2 does not have an image; Case (C): first side P1 does not have an image, and second side P2 has an image; Case (D): first side P1 does not have an image, and second side P2 does not have an image. The inspection criteria table Tb1 includes image inspection criteria set for each case in a given range such as from 1 to 3.

The image forming apparatus 1 includes the first printer 111*a* to form an image on the first side P1 of the sheet P, and the second printer 111*b* to form an image on the second side P2 of the sheet P. Depending on the conditions of image forming operation conducted by the first printer 111*a* and the second printer 111*b*, an image may or may not be formed on the first side P1 of the sheet P, and an image may or may not be formed on the second side P2 of the sheet P.

The evaluation of images formed on the sheet P, such as legibility and clarity, becomes different depending on whether images are present or not on the first side P1 and second side P2. The inspection criteria shown in the table Tb1 can be different, such as from 1 to 3, based on presence or absence of images on the first side P1 and second side P2.

In the image forming apparatus 1, for example, an image is formed on one side (e.g., first side P1) of the sheet P transported on the transport belt 125 using the first printer 111*a*, and then the sheet P is transported to the second printer 111*b* to form an image one other side (e.g., second side P2) of the sheet P using the second printer 111*b*. If the images are formed with such process, the images can be observed on the sheet P as shown in FIG. 6 when the sheet P is viewed from the second side P2, in which the output image G1*p* is formed on the first side P1 of the sheet P by using the first printer 111*a*, and the output image G2*p* is formed on the second side P2 of the sheet P by using the second printer 111*b*.

Figure 6:
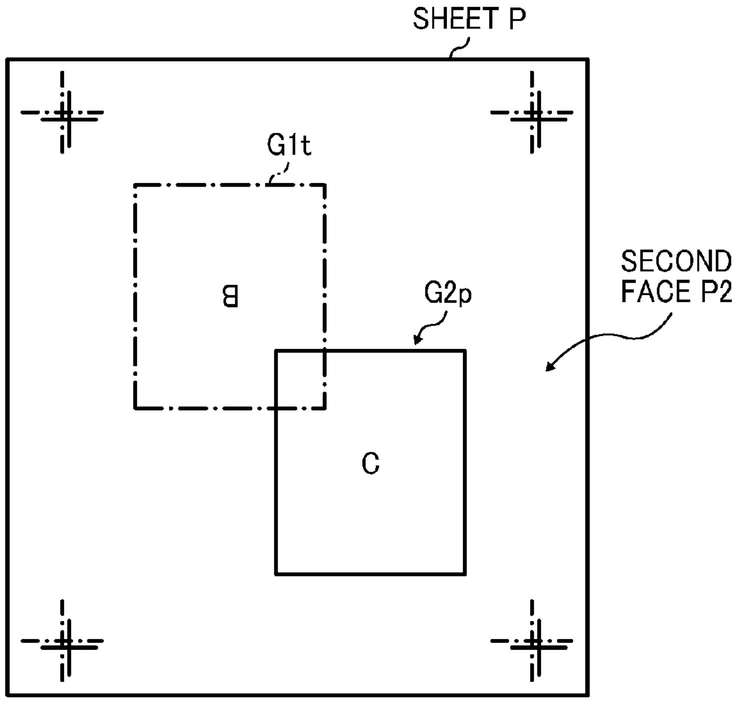
FIG. 6 shows a second side of a sheet after forming one image on a first side and another image on a second side.

If the thickness of sheet P is not so thick, the penetrated image G1*t* indicated by a dashed line in FIG. 6, penetrated from the first side P1 of the sheet P, can be seen on the second side P2 of the sheet P with the output image G2*p* indicated by a solid line in FIG. 6, formed on the second side P2 of the sheet P. As such, the penetrated image G1 which is at least some part of the output image G1*p* can be seen on the second side P2 through the sheet P.

Therefore, the image evaluation such as image legibility level and clarity of the sheet P viewed from each of the first side P1 and the second side P2 becomes different whether the first side P1 has the output image G1*p* or not, and whether the second side P2 has the output image G2*p* or not. Therefore, the image inspection criteria is set differently whether the first side P1 has the output image G1*p* or not, and whether the second side P2 has the output image G2*p* or not.

Further, in FIG. 4, the inspection criteria can be set sever as the image inspection criteria becomes smaller, which means “1” is most sever level, and “3” is the least sever level. Specifically, if both of the first side P1 and the second side P2 have images, the image inspection criteria is set to “1,” which is the strictest level, and the image penetration inspection is conducted very strictly. If one of the first side P1 and the second side P2 has an image, the image inspection criteria is set to “2,” which is the middle level of strictness, and the image penetration inspection is conducted with middle level of strictness. If both of the first side P1 and the second side P2 do not have an image, the image inspection criteria is set to “3,” and the image penetration inspection is not conducted.

The image penetration determination table Tb2 shown in FIG. 5 can be registered with upper permissible limit of image penetration levels corresponding to various dot area ratio of the output image G1*p* for various types of sheet. In addition to the types of sheet, the image penetration determination table Tb2 can be registered with the upper permissible limit of image penetration levels in view of the thickness of sheet, sheet material, or the like. Further, the upper permissible limit of image penetration level can be set differently depending on the types of sheet to be used for printing. If a measured image penetration level is the upper permissible limit of image penetration level or less, the image can be determined as normal. In contrast, if a measured image penetration level is greater than the upper permissible limit of image penetration level, the image can be determined as abnormal.

Further, the image penetration determination table Tb2 includes a plurality of image penetration levels set differently in view of parameters such as image density, and sheet quality as shown in FIG. 4.

When an image is formed on one side of the sheet P, the image is formed on such one side may be observed on the opposite side of the sheet P, which is caused by image penetration effect from the one side to the opposite side. When the image evaluation such as image legibility level and clarity level is conducted for such image formed on the sheet P, the image evaluation result becomes different depending on the image penetration level. For example, the image penetration level becomes different depending on quality of sheet P (e.g., type, thickness of sheet).

Therefore, image penetration levels set for U1, U2 and U3 can be determined by actually forming images on sheets having different sheet qualities by using the first printer 111*a* and/or the second printer 111*b*, and then scanning the formed images by using the first inspection scanner 205*a*, the second inspection scanner 205*b*, and/or the third inspection scanner 205*c*. With such a processing, the image penetration levels can be set for U1, U2 and U3 in view of different sheet qualities, and can be registered in the image penetration determination table Tb2. As similar to the printed image, the image penetration determination table Tb2 registers the image penetration levels based on the dot area ratio of the printed image.

Further, the first inspection scanner 205*a*, the second inspection scanner 205*b*, and the third inspection scanner 205*c* can scan the sheet P being transported on the transport belt 125 (see FIG. 7), in which the image data on the sheet P alone can be extracted from the scanned image data by using color difference between the sheet P and the transport belt 125.

A description is given of image forming and inspecting process. As for the image forming apparatus 1, degradation of the first printer 111*a* and the second printer 111*b* can be suppressed and consumption of consumables can be reduced while effectively inspecting the quality of images formed on sheets.

The image forming apparatus 1 may include a duplex printing function. Upon receiving image data scanned by the scanner 106 or image data transmitted from the personal computer PC, the image forming apparatus 1 can print an image on one side or both sides of the sheet P based on the image data and print settings, and can also conduct the image inspection using the image inspection apparatus 200.

When the image forming apparatus 1 conducts the duplex printing, before forming an image on the second side P2, which is a rear side of the first side P1, based on the image printed on the first side P1, an inspection to determine quality of the output image G1*p* formed on the first side P1 is conducted, and then an inspection to determine quality of an image to be formed on the second side P2 is conducted before forming the image on the second side P2.

As for the image forming apparatus 1, image data scanned by the scanner 106 and having received given image processing can be stored in the HDD 103. Further, while storing the image data as such, coordinate of image data required for the image inspection at the image inspection apparatus 200 can be computed in the main unit 100 of the image forming apparatus 1. The computed coordinate data, bibliographic information, and the image data can be transmitted to the controller 201 of the image inspection apparatus 200, and the image data stored in the HDD 103 can be transmitted to the controller 201 via the NIC 105 of the image forming apparatus 1 and the NIC 104 of the image inspection apparatus 200.

Further, as for the image forming apparatus 1, upon receiving image data and print condition setting command from the personal computer PC, the print condition setting command is analyzed, and the image data is converted to bitmap data as a printable page-by-page data using the image memory 102, and the converted image data is compressed and stored in the HDD 103. While storing the compressed image data as such, coordinate of image data required for the image inspection at the image inspection apparatus 200 can be computed in the main unit 100 of the image forming apparatus 1. The computed coordinate data, bibliographic information, and the image data can be transmitted to the controller 201 of the image inspection apparatus 200 via the NIC 105 of the image forming apparatus 1 and the NIC 104 of the image inspection apparatus 200.

When the image forming apparatus 1 forms an image on the first side P1, the controller 101 of the main unit 100 reads out the image data from the HDD 103, decompresses the image data using the first decompression unit 109*a*, corrects the image data using the first printer correction unit 110*a*, and then transmits the image data to the first printer 111*a*. Meanwhile, in the image forming apparatus 1, the sheet feed unit feeds the sheet P to the transport belt 125. The sheet P being adsorbed on the transport belt 125 is transported to the first printer 111*a*. Based on the image data received from the first printer correction unit 110*a*, the first printer 111*a* forms the output image G1*p* on the first side P1 of the sheet P being transported by the transport belt 125.

A description is given of a process of image inspection according to an example embodiment. Conventionally, the image inspection is conducted on the front side (e.g., first side P1) and rear side (e.g., second side P2) after printing images on both sides of a sheet. Therefore, even if an abnormal image is formed on the first side of the sheet, the image inspection is conducted after printing images on both sides of sheet, which means consumables used for printing an image on the second side of the sheet may become waste of resources.

In light of such problems, in an example embodiment, after printing an image on the first side P1 and before printing an image on the second side P2, the second side P2 is scanned. Based on the scanned result, two inspections may be conducted.

When the image is determined as "no good (NG)" based on an inspection result of the image printed on the first side P1, an error processing such as ejecting the sheet P outside of an apparatus is conducted. If it is determined that a printed image is abnormal when completing the printing on the first side P1, the printing on the second side P2 is not conducted, by which wasteful use of consumables such as toner and sheets can be reduced or suppressed.

At first, upon printing of an image on the first side P1 (e.g., front side), a first inspection is conducted, in which image penetration phenomenon on the second side P2 (e.g., rear side) caused by the image printed on the first side P1 is inspected (i.e., first inspection of two inspections). By scanning the second side P2, the level of image penetration phenomenon can be obtained.

The image penetration determination table Tb2 includes threshold values, set in advance, to be used for determining image quality. The scan result of image formed on the first side P1, and the threshold value are compared. Based on such comparison, it is determined whether the image penetration occurs on the second side P2, which may be caused by the image printed on the first side P1, is at a normal or abnormal level. The abnormal level means that the effect of image penetration phenomenon is too great, and thereby the image penetration phenomenon cannot be ignored.

If it is determined that the level of image penetration phenomenon occurring on the second side P2 is the normal level, the printing operation can be further conducted on the second side P2. If it is determined that the level of image penetration phenomenon occurring on the second side P2 is the abnormal level, the printing operation on the second side P2 can be cancelled. Further, as for this first inspection, the threshold values for determining the abnormal level can be changed depending on sheet quality such as types of sheet.

Further, the determination of the first inspection can be also conducted as follows by comparing a threshold value, and an index value, wherein the index value can be computed by combining the image penetration level caused on the second side P2 from the first side P1, and a toner amount to be used for forming an image on the second side P2.

For example, when determining the image penetration level to the second side P2 from the first side P1, if the image penetration level caused by the image printed on the first side P1 is great, and further, if image data to be printed on the second side P2 is also great, to-be-used toner amount becomes great, by which the to-be-used toner amount may exceed the maximum toner amount that can be used for the sheet P.

In such a case, a threshold value is set for the maximum toner amount, and the threshold value is compared with the above index value computed by combining the image penetration level caused on the second side P2, and a toner amount to be used for forming an image on the second side P2 to determine whether the printing can be conducted in a normal or abnormal manner.

Then, a second inspection (i.e., prediction inspection) is conducted. Based on the image penetration level determined by the above described first inspection, and image data to be printed on the second side P2, an image penetration level occurring on the first side P1 from the second side P2 can be predicted (i.e., estimating an image penetration level to the first side P1). As such, a prediction inspection for the first side P1 (i.e., second inspection of two inspections) can be conducted.

When the duplex printing is conducted, one image penetration occurs from the first side P1 to the second side P2, and another image penetration occurs from the second side P2 to the first side P1 in a similar manner. Therefore, based on image data printed on the first side P1 and the image penetration level to the second side P2 from the first side P1, an image penetration level to the first side P1 from the second side P2 can be predicted when an image is to be printed on the second side P2.

If an image is printed on the first side P1, as above described, based on image data printed on the first side P1 and the image penetration level to the second side P2 from the first side P1, the image penetration level to the second side P2 can be determined. Then, based on image data to be printed on the second side P2, an image penetration level to the first side P1 can be predicted.

Because an actual image penetration level to the second side P2 is obtained, by using the actual image penetration level, the image penetration level to the first side P1 from the second side P2 when an image is printed on the second side P2 can be predicted, in which a table may not be set.

By using such predicted result, an index value obtained by combining the image penetration level to be caused on the first side P1 and a toner amount already used for forming an image on the first side P1 is compared with a threshold value set for the maximum toner amount useable on the on the first side P1 to determine whether a printing can be conducted in a normal or abnormal manner.

Figure 8:
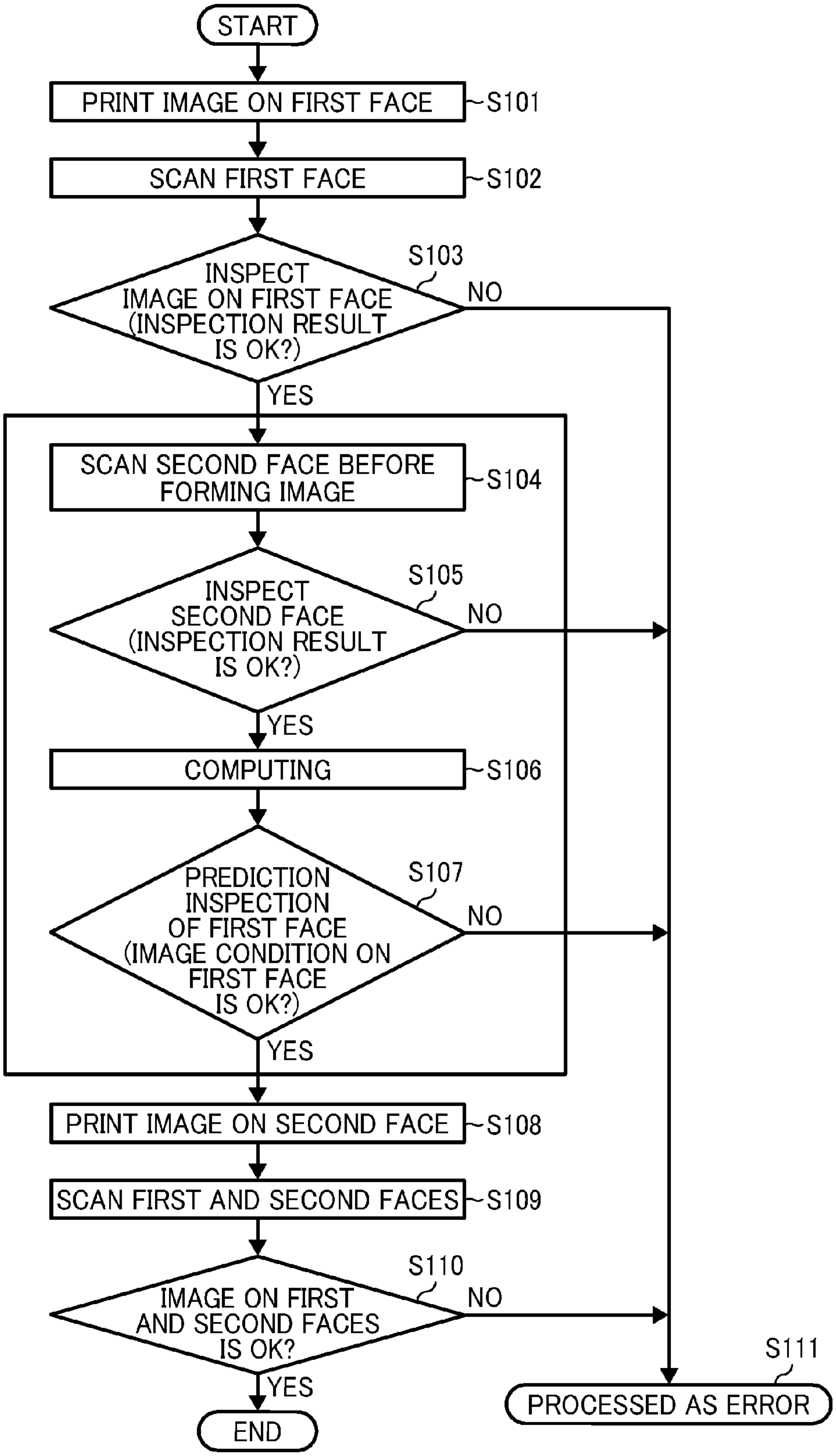
FIG. 8 shows a flowchart of a process of inspecting images formed on a sheet.

A description is given of process of image inspection with reference to FIG. 8, which shows a flowchart of steps of image inspection process according to an example embodiment. The image inspection process can be activated when the first printer 111*a* of the image forming apparatus 1 prints an image on the sheet P, which is a target print image (or output image G1*p*) printed on the first side P1 of the sheet P (step S101).

Figure 7:
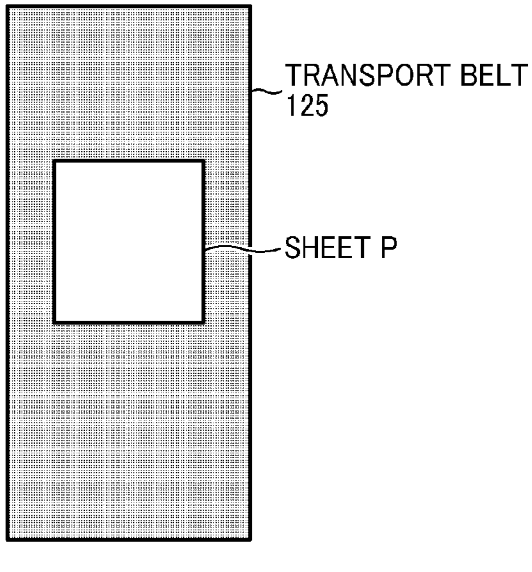
FIG. 7 shows a transport belt used for transporting a sheet.

Then, in the image forming apparatus 1, as shown in FIG. 7, the transport belt 125 transports the sheet P having formed with the output image G1*p* on the first side P1 to the first inspection scanner 205*a* disposed in the image inspection apparatus 200. The first inspection scanner 205*a* scans the output image G1*p* formed on the first side P1 of the sheet P (step S102) to obtain data G1*y*. The data G1*y*, obtained by the scanning the first side P1 using the first inspection scanner 205*a* after forming the image on the first side P1, receives a correction process such as a filtering process at the first scanner correction unit 206*a*, and then compressed by the first compression unit 207*a*, as required, and stored in the HDD 203. As such, the data G1*y* is obtained by the scanning the first side P1 after forming the image on the first side P1.

Then, the controller 201 compares the data G1*y* and the first source image data. The data G1*y* is the data of the image, formed on the first side P1 and scanned by the first inspection scanner 205*a* and then stored, for example, in the HDD 203. As such, the data G1*y* is obtainable by scanning the output image G1*p* formed on the first side P1. Meanwhile, the first source image data, transmitted from the main unit 100 to the controller 201, is image data stored in the HDD 203 and not yet receiving the correction process. As above described, image data having received the correction process is used for a printing operation of the first printer 111*a*. By comparing the data G1*y* and the first source image data used for printing the output image G1*p*, the controller 201 determines whether the image (i.e., output image G1*p*) formed on the first side P1 of the sheet P by the first printer 111*a* has an acceptable level of image quality (step S103).

At step S103, if the difference between the data G1*y* and the first source image data exceeds the reference value for difference set in advance (step S103: NO), the controller 201 determines that the output image G1*p* is a failed image, which means the output image G1*p* is determined as "not good (NG)" for image quality. Then, the controller 201 conducts an abnormal image processing. For example, the controller 201 conducts an error processing such as ejecting the sheet P outside an apparatus by using the error processing unit 114 without conducting the subsequent image forming process and image inspection process (step S111).

In contrast, if the difference between the data G1*y* and the first source image data is within the reference value for difference (step S103: YES), the controller 201 determines that the output image G1*p* is a normal image, which means the output image G1*p* is determined "OK" for image quality, and the process goes to step S104.

Then, in the image forming apparatus 1, the image penetration inspection is conducted as shown in steps S104 to S107. In the image penetration inspection process, the sheet P is passed through the first printer 111*a* and the first inspection scanner 205*a* by using the transport belt 125, then the sides of the sheet P is inverted from the first side P1 (front side) to the second side P2 (rear side) by the sheet inverter 130, and the sheet P is further transported to the second inspection scanner 205*b*.

The second inspection scanner 205*b* scans the second side P2 of the sheet P to obtain the data G2*a*. The data G2*a* can be obtained by scanning the second side P2 of the sheet P before forming an image (i.e., output image G2*p*) on the second side P2. The data G2*a* is then corrected by the second scanner correction unit 206*b*, and then compressed by the second compression unit 207*b*, if required, and stored in the HDD 203 (step S104).

Then, the controller 201 conducts the following inspection using the pre-print image penetration inspection unit 211. Specifically, based on the data G2*a*, obtained by scanning the second side P2 of the sheet P by the second inspection scanner 205*b*, the pre-print image penetration inspection unit 211 inspects the image penetration level on the second side P2 before forming an image on the second side P2 at the second printer 111*b*, in which image penetration phenomenon caused on the second side P2 by the output image G1*p*, formed on the first side P1, is inspected (step S105).

If the image penetration level on the second side P2 is greater than a threshold value set in advance (step S105: NO), the data G2*a* is determined as "no good (NG)," and the controller 201 conducts an abnormal image processing. For example, the controller 201 conducts an error processing such as ejecting the sheet P outside an apparatus by using the error processing unit 114 without conducting the subsequent image forming process and image inspection process (step S111).

In contrast, if the image penetration level to the second side P2 is less than a threshold value set in advance (step S105: YES), the data G2*a* is determined as "OK," and then the pre-print image penetration prediction unit 212 conducts the following computing process at step S106.

Hereinafter, image data having, for example, the dot area ratio of (50, 70) is used for the explanation. At step S106, image data having the dot area ratio of (50, 70) is used, in which an image is to be formed on the first side P1 with the dot area ratio of 50, and an image is to be formed on the second side P2 with the dot area ratio of 70. Further, in the following explanation, sheet A (see FIG. 5) may be used as the sheet P.

At first, an image is printed or formed on the first side P1 of the sheet A. If the image printed on the first side P1 is determined as a normal image, which means not an abnormal image, the second side P2 of the sheet A is scanned to inspect the second side P2. If the image penetration level to the second side P2 is determined as 4.0 based on the scan result of the second side P2, it means that the image penetration of 4.0 occurs when the image is printed on the first side P1 with the dot area ratio of 50. Then, the image penetration determination table Tb2 is referred to check the image penetration level to the second side P2 corresponding to the dot area ratio of 50 of the sheet A.

When the image is printed on the first side P1 of the sheet A with the dot area ratio of 50, the upper permissible limit of image penetration level is set, for example, at 5.0. Therefore, the image penetration level of 4.0 that occurs on the second side P2 is less than the threshold value. Therefore, the process goes to step S107.

In this case, the image is already printed on the first side P1 of the sheet A with the dot area ratio of 50. Then, an image is to be printed on the second side P2 of the sheet A with the dot area ratio of 70. At this timing, the condition on the first side P1 after printing the image on the second side P2 can be predicted. Specifically, it can predict that an expected image penetration level of, for example, (70/50)×4.0=5.6 may occur on the first side P1.

Then, the prediction inspection for the first side P1 is conducted (step S107). Specifically, based on the dot area ratio of 50 of the image already printed on the first side P1, and the expected image penetration level of 5.6, it is determined whether the total amount of toner to be used on the first side P1 exceeds an allowable maximum toner amount on the first side P1.

If the total amount of toner exceeds the allowable maximum toner amount, it is determined as "no good (NG)." If the total amount of toner does not exceed the allowable maximum toner amount, it is determined as "OK." Then, the process shifts to an actual printing of image on the second side P2 (step S108). Further, after printing the image on the second side P2, an actual printed condition on the first side P1 and the second side P2 can be inspected (steps S109 and S110).

At step S107, the image penetration prediction for the first side P1 is conducted. Specifically, the second inspection scanner 205*b* scans the second side P2 to inspect an image penetration level on the second side P2, which is caused by the output image G1*p* formed on the first side P1. By conducting such scanning, the data G2*a* corresponding to the condition of the second side P2 can be obtained. As such, the data G2*a* can be obtained by scanning the second side P2 of the sheet P before forming the output image G2*p* on the second side P2. Based on the data G2*a* obtained by the second inspection scanner 205*b*, the image penetration level to be caused on the first side P1 by forming the output image G2*p* on the second side P2 is predictably inspected, by which the image penetration prediction inspection can be conducted for the first side P1.

In the above described image penetration inspection, an image penetration from the first side P1 to the second side P2 is inspected (i.e., inspecting image penetration to second-face), and an expected image penetration from the second side P2 to the first side P1 is inspected (i.e., inspecting expected image penetration to the first side).

In the inspection of image penetration to the second-face P2, the image-penetrated effect from the first side P1 to the second side P2 is inspected.

In the expected image penetration inspection for the first side, the expected image penetration of the output image G2*p*, to be formed on the second side P2, to the first side P1 is predictably inspected based on the image penetration level to the second side P2 from the first side P1.

A description is given of the image penetration inspection for the second side. As shown by a dashed line in FIG. 6, the output image G1*p* formed on the first side P1 may penetrate to the second side P2, by which a penetrated image G1*t* may appear on the second side P2. The controller 201 instructs the second inspection scanner 205*b* to scan the second side P2 before forming an image on the second side P2 at the second printer 111*b*, by which the image penetration effect of the output image G1*p*, formed on the first side P1, to the second side P2 can be observed and measured as the penetrated image G1*t* having a given image penetration level. Based on the penetrated image G1*t*, it is determined whether the image has an acceptable level of image quality. The image quality determination process will be explained in detail later.

A description is given of expected image penetration inspection for the first side. In the expected image penetration inspection for the first side, based on the image penetration level from the first side P1 to the second side P2 caused by the output image G1*p* formed on the first side P1, the image penetration effect caused on the first side P1 by an image to be formed on the second side P2 (i.e., output image G2*p*) is predictably inspected.

In the expected image penetration inspection for the first side, before forming the output image G2*p* on the second side P2, the second side P2 is scanned by the second inspection scanner 205*b*, by which the penetrated image G1*t* can be scanned. Based on the penetrated image G1*t* scanned by the second inspection scanner 205*b*, and the second source image data transmitted from the main unit 100 and stored in the HDD 203, which is image data before receiving a correction process for printing the output image G2*p*, an image penetration effect of the output image G2*p*, to-be-formed on the second side P2, to the first side P1 can be predictably determined, and then it can determine whether an image has an acceptable level of image quality.

A description is given of process of determining image quality in the above described image penetration inspection for the second side based on the image penetration level.

As above described, the image penetration level can be set in view of sheet quality such as types of sheet, thickness of sheet, or the like. Because various types of sheet can be used, the quality of sheet P may not be same, and thereby the image penetration level corresponding to sheets having different quality is required to be set. Therefore, as for the image forming apparatus 1, the image penetration determination table Tb2 (FIG. 5) registering a plurality of image penetration levels is stored in ROM 220 or the HDD 203 of the controller 201. The image penetration determination table Tb2 registers the plurality of image penetration levels in view of sheet quality such as types of sheet, thickness of sheet, or the like, and the dot area ratio of the output image G1*p* to be formed on the first side P1.

When the output image G1*p* is formed on the first side P1 with a given dot area ratio (i.e., the output image G1*p* is formed on a plurality of areas), based on the data G2*a* obtained by scanning the second side P2 of the sheet P before forming the output image G2*p*, the controller 201 refers the image penetration determination table Tb2 to select a suitable image penetration level in view of the dot area ratio used for the output image G1*p* and the sheet type.

At the image penetration inspection for the second side at step S105, the controller 201 determines whether the image penetration level obtained by using the second inspection scanner 205*b* is smaller than a reference value set in the image penetration determination table Tb2 in view of the dot area ratio and the sheet type.

If the image penetration level obtained by using the second inspection scanner 205*b* is smaller than the reference value of the image penetration level, the controller 201 determines that the output image G1*p* formed on the first side P1 is a normal image. If the image penetration level obtained by using the second inspection scanner 205*b* is greater than the reference value of the image penetration level, the controller 201 determines that the output image G1*p* formed on the first side P1 is a failed image.

A description is given of process determining image quality for the expected image penetration inspection for the first side based the image penetration level. As similar to the image penetration inspection for the second side, the controller 201 refers the image penetration determination table Tb2 for the expected image penetration inspection for the first side.

Based on the image penetration determination table Tb2, and based on the second source image data, corresponding to the image data to be formed on the second side P2 transmitted from the main unit 100 and stored in the HDD 203, the controller 201 obtains the dot area ratio of the output image G2*p* to be formed on the second side P2.

Then, the controller 201 predicts the image penetration level to the first side P1 to be caused by the output image G2*p*. The controller 201 conducts the expected image penetration inspection for the first side based on the image penetration effect of the to-be-formed output image G2*p* to the first side P1.

In general, when the duplex printing is conducted, the image penetration effect from the first side P1 to the second side P2, and the image penetration effect from the second side P2 to the first side P1 may occur with a substantially same level. In view of such feature, the expected image penetration inspection for the first side can be conducted as follows.

Specifically, if the image density of the data G2*a* (i.e., data of penetrated image) is determined smaller than the image inspection criteria set for a given type of sheet, the controller 201 determines that the output image G1*p* formed on the first side P1 is a normal image. The data G2*a*, obtained by scanning the second side P2 of the sheet before forming the output image G2*p*, corresponds to the image penetration level caused on the second side P2 by the output image G1*p*.

In contrast, if the image density of data G2*a* (i.e., data of penetrated image) is determined greater than the image inspection criteria set for a given type of sheet, the controller 201 determines that the output image G1*p* formed on the first side P1 is a failed image. The data G2*a*, obtained by scanning the second side P2 of the sheet before forming the output image G2*p*, corresponds to the image penetration level caused on the second side P2 by the output image G1*p*.

In the expected image penetration inspection for the first side, the controller 201 determines whether a printed or to-be-printed image has an acceptable level of image quality based on the image inspection criteria settable by a combination of cases that the first side P1 has an image or no image thereon and the second side P2 has an image or no image thereon. Such image inspection criteria can be set as shown in the inspection criteria table Tb1 of FIG. 4.

As shown in FIG. 4, combinations can be selected from two cases for the first side P1 that an image is present/not present on the first side P1, and two cases for the second side P2 that an image is present/not present on the second side P2, by which four cases can be set in total. A description is given of image inspection under such four cases. A process for determining whether an image is present/absence can be conducted page-by-page for the sheet P, or a given area.

Case (A): No Image on First Side P1/No Image on Second Side P2

In this case, because images are not formed on the first side P1 and the second side P2, the controller 201 does not conduct the image penetration inspection based on the image inspection criteria of 3. As such, the image inspection criteria of 3 means that the image penetration inspection is not conducted. Although stains such as foreign particles may be present on a sheet, because a printed image is not present on the sheet, the image inspection may not be required.

Case (B): Image on First Side P1/No Image on Second Side P2

In this case, the output image G1*p* is present on the first side P1, but no image is formed on second side P2, in which the image inspection criteria of 2 may be used, which is not so strict compared to the image inspection criteria of 1. The controller 201 conducts the image penetration inspection to inspect a penetration effect of the output image G1*p*, formed on the first side P1, to the second side P2, in which the controller 201 determines the image quality of the output image G1*p* based on the image penetration level. Because no image is present on the second side P2, even if foreign particles exist on the second side P2, such foreign particles may not cause problems. However, if the image penetration level of the output image G1*p* becomes too great, a recording agent such as ink, toner, or the like may stick to other sheets stacked on the concerned sheet printed with the output image G1*p*. Therefore, the controller 201 inspects the sheet P with the image inspection criteria of "2" which is not so strict compared to a case that images are present on both sides of the sheet P.

Case (C): No Image on First Side P1/Image on Second Side P2

In this case, an image is not formed on the first side P1, and thereby the scanning is not conducted for the first side P1, and further, the scanning is not conducted for the second side P2 before forming an image on the second side P2. Then, after forming an image on the second side P2, the image inspection is conducted by scanning both of the first side P1 and the second side P2.

Case (D): Image on the First Side P1/Image on the Second Side P2:

In this case, because an image is formed on the first side P1, and another image is formed on the second side P2, the controller 201 conducts an image penetration inspection for the second side P2 based on the image inspection criteria of 1, which is the strictest level, in view of the output image G1*p* formed on the first side P1. Specifically, as for the image penetration inspection for the second side P2, if an image is present on the second side P2, such image becomes an inspection target area. Therefore, the controller 201 conducts the image penetration inspection to inspect a penetration effect of the output image G1*p*, formed on the first side P1, to the second side P2 based on the image inspection criteria of 1, which the strictest level. As above mentioned, if no image is present on the second side P2, the controller 201 conducts the image penetration inspection based on the image inspection criteria of 2, which is not so strict compared to the image inspection criteria of 1. Further, if the image density of the output image G2*p* to be formed on the second side P2 is great, which means that the toner amount for the output image G2*p* becomes very close to a maximum print-use-allowed toner amount, and if the image penetration level of the output image G1*p* formed on the first side P1 is great, the toner amount to be put on the sheet P may exceed the maximum print-use-allowed toner amount. Therefore, the controller 201 conducts the image penetration inspection in view of the toner amount to be used for forming an image on the second side P2. In general, if the toner amount to be put on the sheet P may exceed the maximum print-use-allowed toner amount, the first printer 111*a* and the second printer 111*b* using the electrophotography system may be damaged and, at worst, broken. Further, if the toner amount exceeds the print-use-allowed toner amount, the color of the image may not be reproduced correctly, and further, toner may not be effectively fused on the sheet P, by which such toner may be undesirably transferred to other sheets as stains when the sheet P is stacked on or under other sheets. To prevent such problems, the image penetration phenomenon causable by the output image G1*p* formed on the first side P1 to the second side P2 is inspected before forming an image on the second side P2.

Upon completing the inspection of the image penetration, the controller 101 of the main unit 100 of the image forming apparatus 1 reads out image data of an image to be formed on the second side P2 (or rear side) from the HDD 103. After conducting the image processing to the image data at the second decompression unit 109*b* and the second printer correction unit 110*b*, the image data is transmitted to the second printer 111*b* so that the second printer 111*b* can form the output image G2*p* on the second side P2 of the sheet P.

Upon forming the output image G2*p* on the second side P2 of the sheet P by using the second printer 111*b*, the controller 201 of the image inspection apparatus 200 instructs the third inspection scanner 205*c* to scan the second side P2, formed with the output image G2*p*, to obtain the data G2*b*. As such, the data G2*b* can be obtained by scanning the second side P2 after forming the output image G2*p* on the second side P2.

The data G2*b* obtained by the third inspection scanner 205*c* is compared with the source image data corresponding to the output image G2*p* to conduct an image inspection on the second side P2 after forming the output image G2*p* on the second side P2. The source image data, which may be stored in the HDD 203, is used to form the output image G2*p* using the second printer 111*b*. The source image data may be read out from the HDD 203, and transmitted to the second printer correction unit 110*b* under the control of the controller 101 of the main unit 100.

For example, when an image is not formed on the first side P1, which means that no image is present on the first side P1, and an image is present on the second side P2, the controller 201 conducts the image inspection process as similar to the image inspection process for the above case (C).

For example, when an image is formed on the first side P1, which means that the image is present on the first side P1, and an image is present on the second side P2, the controller 201 conducts the image inspection process as similar to the image inspection process for the above case (D).

Further, when an image is present on the first side P1, image penetration phenomenon caused by the output image G1*p* formed on the first side P1 may occur to the second side P2. Therefore, the data G2*a* obtained by the second inspection scanner 205*b* may be subtracted from the data G2*b*, obtained by the third inspection scanner 205*c*, to cancel the effect of image penetration phenomenon. As above described, the data G2*a* is obtainable by scanning the second side P2 of the sheet P before forming the output image G2*p* on the second side P2, and the data G2*b* is obtainable by scanning the second side P2 of the sheet P after forming the output image G2*p* on the second side P2.

Further, before forming an image by using the second printer 111*b*, the source image data (i.e., image data before receiving correction process for printing) stored in the HDD 203 may be processed with the data G2*a*, obtained by the second inspection scanner 205*b*, to cancel the effect of image penetration effect, and then the image inspection may be conducted. The data G2*a* is obtainable by scanning the second side P2 of the sheet P before forming the output image G2*p* by using the second inspection scanner 205*b*, in which the penetrated image G1*t*, caused by the output image G1*p* formed on the first side P1, may be observed on the second side P2.

In the above described example embodiment, an image forming operation can be conducted by using two printers such as the first printer 111*a* and the second printer 111*b*, and an image inspection operation can be conducted by using three inspection scanners to scan images present on the sheet P such as the first inspection scanner 205*a*, the second inspection scanner 205*b*, and the third inspection scanner 205*c*. In the above described example embodiment, the transport belt 125 sequentially transports the sheet P from the first printer 111*a*, the first inspection scanner 205*a*, the second inspection scanner 205*b*, the second printer 111*b*, and to the third inspection scanner 205*c*.

However, an image forming apparatus having the image inspection apparatus 200 can be configured differently. For example, an image forming apparatus having an image inspection apparatus may include one printer or plotter disposed as an image forming apparatus to form an image, and two inspection scanners such as a pre-print inspection scanner and a post-print inspection scanner, and an inverting transport system. The printer may be disposed between the pre-print inspection scanner and the post-print inspection scanner.

The sheet P can be transported from the sheet feed unit to the printer, and then the printer forms an image on the first side P1 of the sheet P. Then, the post-print inspection scanner scans the first side P1. After scanning the first side P1, the inverting transport system inverts the first side P1 (front side) and the second side P2 (rear side) of the sheet P. The inverted sheet P is transmitted to the pre-print inspection scanner, and the pre-print inspection scanner scans the second side P2 of the sheet P. Then, the printer forms an image on the second side P2 of the sheet P, and the post-print inspection scanner scans the second side P2 formed with the image.

In the above described example embodiment, an image forming apparatus using electrophotography system is employed for the first printer 111_a_ and the second printer 111_b_, but the image forming apparatus is not limited to the electrophotography system, but, for example, the inkjet system can be used for the image forming apparatus.

As above described, the image forming apparatus 1 may include the second inspection scanner 205_b_ useable as a scanner to scan the second side P2, the first inspection scanner 205_a_ useable as a scanner to obtain image information present on the first side P1 (image information obtaining unit), and the controller 201.

In the image forming apparatus 1, an image can be formed on the first side P1 of the sheet P (recording medium), and then an image can be formed on the second side P2 of the sheet P. Before forming the image on the second side P2, the second inspection scanner 205_b_ scans the second side P2 to output the data G2_a_.

The first inspection scanner 205_a_ scans the first side P1. When the first inspection scanner 205_a_ scans the first side P1 formed with the output image G1_p_, the data G1_y_ is obtained.

The controller 201 can obtain the first source image data, corresponding to the image formed on the first side P1. As such, the controller 201 is useable as an image information obtaining unit that can obtain image information present on the first side P1.

Based on the data G2_a_, obtained by scanning the second side P2 before forming the output image G2_p_ on the second side P2, and the information of the image formed on the first side P1, the controller 201 can predict an expected image penetration level to the first side P1, which may be caused by the output image G2_p_ to-be-formed on the second side P2. As such, the controller 201 can be used as an image-quality determination unit or the first side.

Further, based on the second source image data, which is the source data for forming the output image G2_p_, and the expected image penetration level to the first side P1, the controller 201 determines whether the image to be formed on the second side P2 has an acceptable level of image quality. As such, the controller 201 can be used as an image-quality determination unit for the second side.

Therefore, before forming an image on the second side P2, it can determine whether an image to be formed on the second side P2 has an acceptable level of image quality. With such a configuration, while preventing degradation of image forming devices and reducing consumption of consumables, it can inspect whether an image has an acceptable level of quality.

The present invention can be implemented in any convenient form, for example using dedicated hardware such as the ROM 220, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, processing devices, processing circuits or the like such as a programmed processor, a circuit, an application specific integrated circuit (ASIC), used singly or in combination. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit does include the above-described hardware executing software.

The above described pre-print image penetration inspection unit 211, the pre-print image penetration prediction unit 212, the post-print image inspection unit 213, and the error processing unit 214 can be implemented as modules by executing one or more programs according to an example embodiment. Specifically, the CPU 210 or a processing device reads programs from a storage and executes the programs loaded on a main memory such as RAM 230, by which the pre-print image penetration inspection unit 211, the pre-print image penetration prediction unit 212, the post-print image inspection unit 213, the error processing unit 214 can be implemented on a main memory.

Therefore, before forming an image on the second side P2, it can determine whether the image to be formed on the second side P2 has an acceptable level of image quality. With such a configuration, while preventing degradation of image forming devices and reducing consumption of consumables, it can inspect whether an image has an acceptable level of quality.

Further, as for the image forming apparatus 1, the information indicating presence or absence of image on the first side P1 can be obtained as image information of the first side P1.

Therefore, the image information of the first side P1 can be obtained simply and easily. With such a configuration, while preventing degradation of image forming devices and reducing consumption of consumables, it can inspect whether an image has an acceptable level of quality.

Further, as for the image forming apparatus 1, the pre-print image penetration prediction unit 212 of the controller 201 can be used as the image penetration prediction unit for the first side. At least one portion of the first side P1 and the second side P2 of the sheet P such as an entire or partial area of the first side P1 and the second side P2 of the sheet P can be set as a determination area. Based on the data G2*a* obtained at the determination area, and the image information on the first side P1, the controller 201 can predict the expected image penetration level to the first side caused by the output image G2*p*.

Therefore, the expected image penetration level to the first side can be predicted in view of the image density formed on the first side P1 and the second side P2, and thereby the image quality can be determined. With such a configuration, it can determine whether an image has an acceptable level of quality more effectively.

Further, the image forming apparatus 1 can sequentially form an image on the first side P1, and an image on the second side P2 of the sheet P based on corresponding image data, and the image inspection apparatus 200 can inspect quality of image formed on the sheet P to determine whether the formed image has an acceptable level of quality.

Therefore, before forming an image on the second side P2, it can determine whether the image to be formed on the second side P2 has an acceptable level of quality. With such a configuration, while preventing degradation of image forming devices and reducing consumption of consumables, it can inspect whether an image has an acceptable level of image quality.

As such, the above described example embodiment according to the present invention can prevent degradation of image forming devices and can reduce consumption of consumables while inspecting whether a formed image has an acceptable level of quality.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image inspection apparatus for inspecting images formed on a recording medium having a first side and a second side opposite the first side, comprising:

a penetrated-image information obtaining unit to obtain penetrated-image information corresponding to an image penetration from the first side to the second side when an image is formed on the first side;

an inspection information storage to store information used for an image penetration inspection, the information including an upper permissible limit of image penetration from the first side to the second side caused by the image formed on the first side;

a pre-print image penetration inspection unit, using a processing device, configured to:

obtain an image penetration level from the first side to the second side based on the penetrated-image information obtained by the penetrated-image information obtaining unit;

compare the obtained image penetration level and the upper permissible limit of image penetration stored in the inspection information storage; and inspect an image penetration from the first side to the second side when the image is formed on the first side of the recording medium;

a pre-print image penetration prediction unit to predict, before an image is formed on the second side, an image penetration level from the second side to the first side caused by the image to be formed on the second side, based on the penetrated-image information obtained by the penetrated-image information obtaining unit and data of the image to be formed on the second side; and a post-print image inspection unit, using the processing device, to inspect quality of the image already formed on the first side and the image formed on the second side after forming the image on the second side, based on the prediction result computed by the pre-print image penetration prediction unit.

2. The image inspection apparatus of claim 1, wherein the first side and the second side of the recording medium are set with a determination area used for an image inspection, the determination area comprising at least a portion of the first side and the second side, wherein the pre-print image penetration prediction unit predicts an expected image penetration level to the first side from the second side at the determination area caused by the image to be formed on the second side based on data of the image to be formed on the second side and data of the image already formed on the first side.

3. The image inspection apparatus of claim 1, wherein when the pre-print image penetration inspection unit determines that the image penetration level caused on the second side by the image formed on the first side exceeds the upper permissible limit of image penetration on the second side, the image forming apparatus executes error processing including at least a sheet ejection process without executing a subsequent image forming process and image inspection process.

4. An image forming apparatus, comprising:

an image forming unit to form an image on a recording medium having a first side and a second side opposite the first side based on image data, one image formable on the first side and sequentially another image formable on the second side; and the image inspection apparatus of claim 1.

5. A method of inspecting images formed on a recording medium having a first side and a second side opposite the first side using an image inspection apparatus having an inspection information storage to store information used for an image penetration inspection, the information including an upper permissible limit of image penetration caused by an image formed on the first side to the second side, the method comprising the steps of:

1) obtaining penetrated-image information corresponding to an image penetration from the first side to the second side when an image is formed on the first side;
2) obtaining the image penetration level from the first side to the second side based on the penetrated-image information obtained by step 1);
3) comparing the obtained image penetration level and the upper permissible limit of image penetration stored in the inspection information storage;
4) inspecting an image penetration from the first side to the second side when the image is formed on the first side of the recording medium;
5) predicting an image penetration level from the second side to the first side caused by an image to be formed on the second side, before forming the image on the second side, based on the penetrated-image information obtained by step 1) and data of the image to be formed on the second side; and
6) inspecting quality of the image already formed on the first side and the image formed on the second side after forming the image on the second side based on the prediction result computed at the predicting step.

6. A non-transitory computer-readable storage medium storing a program that, when executed by a computer, causes the computer to execute a method of inspecting images formed on a recording medium having a first side and a second side opposite the first side using an image inspection apparatus having an inspection information storage to store information used for an image penetration inspection, the information including an upper permissible limit of image penetration caused by an image formed on the first side to the second side, the method comprising the steps of:

1) obtaining penetrated-image information corresponding to an image penetration from the first side to the second side when an image is formed on the first side;
2) obtaining the image penetration level from the first side to the second side based on the penetrated-image information obtained by step 1);
3) comparing the obtained image penetration level and the upper permissible limit of image penetration stored in the inspection information storage;
4) inspecting an image penetration from the first side to the second side when the image is formed on the first side of the recording medium;
5) predicting an image penetration level from the second side to the first side caused by an image to be formed on the second side, before forming the image on the second side, based on the penetrated-image information obtained by step 1), and data of the image to be formed on the second side; and
6) inspecting quality of the image already formed on the first side and the image formed on the second side after forming the image on the second side based on the prediction result computed at the predicting step.

* * * * *